US008834737B2

United States Patent
Xiong et al.

(10) Patent No.: US 8,834,737 B2
(45) Date of Patent: Sep. 16, 2014

(54) METHOD FOR MAKING CARBON NANOTUBE COMPOSITE FILMS

(75) Inventors: Wei Xiong, Beijing (CN); Jia-Ping Wang, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 92 days.

(21) Appl. No.: 13/568,503

(22) Filed: Aug. 7, 2012

(65) Prior Publication Data

US 2013/0168598 A1 Jul. 4, 2013

(30) Foreign Application Priority Data

Dec. 28, 2011 (CN) .......................... 2011 1 0447131

(51) Int. Cl.
  H01F 1/42 (2006.01)
  B05D 5/12 (2006.01)
  B05B 7/24 (2006.01)

(52) U.S. Cl.
  USPC .............. 252/62.51 R; 252/62.55; 252/62.54; 977/753; 977/748; 977/838; 977/960; 977/842; 977/773; 977/742

(58) Field of Classification Search
  USPC ......... 977/753, 748, 838, 960, 842, 773, 742; 252/62.51 R, 62.55, 62.54
  See application file for complete search history.

(56) References Cited

U.S. PATENT DOCUMENTS

| 2003/0122111 A1 | 7/2003 | Glatkowski |
| 2011/0097512 A1 | 4/2011 | Zhou et al. |
| 2011/0180968 A1 | 7/2011 | Hu et al. |

FOREIGN PATENT DOCUMENTS

| CN | 102268783 | 12/2011 |
| JP | 2004-261713 | 9/2004 |
| TW | 201121879 | 7/2011 |
| TW | 201134576 | 10/2011 |

OTHER PUBLICATIONS

Xuemei Yang, Chen Wang, Ming Li, "Electromagnetic Wave Absorbing Properties of CNTs/Perrite/PVDF Composites", Journal of material science and engineering, vol. 26, No. 2, p. 213-216, 2008.
Brianna C. Thompson, Jun Chen, Simon E. Moulton and Gordon G. Wallance, "Nanostructured aligned CNT platforms enhance the controlled release of a neurotrophic protein from polypyrrole", Nanoscale, vol. 2, p. 499-501, 2010.

*Primary Examiner* — Carol M Koslow
(74) *Attorney, Agent, or Firm* — Novak Druce Connolly Bove + Quigg LLP

(57) ABSTRACT

A method for making a carbon nanotube composite film is provided. A PVDF is dissolved into a first solvent to form a PVDF solution. A number of magnetic particles is dispersed into the PVDF solution to form a suspension. A carbon nanotube film is immersed into the suspension and then transferred into a second solvent. The carbon nanotube film structure is transferred from the second solvent and dried to form the carbon nanotube composite film.

17 Claims, 6 Drawing Sheets

US 8,834,737 B2

METHOD FOR MAKING CARBON NANOTUBE COMPOSITE FILMS

CROSS-REFERENCE TO RELATED APPLICATIONS

This application claims all benefits accruing under 35 U.S.C. §119 from China Patent Application No. 201110447131.0, filed on Dec. 28, 2011 in the China Intellectual Property Office, the disclosure of which is incorporated herein by reference. This application is related to applications entitled, "METHOD FOR MAKING CARBON NANOTUBE COMPOSITE FILMS", patent application Ser. No, 13/568,490, filed on Aug. 7, 2012, "METHOD FOR MAKING CARBON NANOTUBE COMPOSITES", patent application Ser. No. 13/568,487, filed on Aug. 7, 2012, "CARBON NANOTUBE MICRO-WAVE ABSORBING FILMS", patent application Ser. No. 13/568,496, filed on Aug. 7, 2012, and "CARBON NANOTUBE COMPOSITE FILMS", patent application Ser. No. 13/568,517, filed on Aug. 7, 2012.

BACKGROUND

1. Technical Field

The present disclosure relates to a method for making carbon nanotube composite films.

2. Description of Related Art

Carbon nanotubes are tubules of carbon generally having diameters ranging from 0.5 nanometers to 50 nanometers. Because carbon nanotubes are microscopic structures, it is necessary to assemble the carbon nanotubes into macroscopic structures.

A method for making a carbon nanotube composite film comprises steps of: providing a mixture comprising a number of carbon nanotubes, a number of magnetic particles and a poly vinylidene difluoride (PVDF); and pressing the mixture at a certain temperature to form the carbon nanotube composite film. The carbon nanotube composite film has a certain magnetic permeability. However, it is hard to disperse the carbon nanotubes powders and the magnetic particles uniformly into the PVDF. Thus, the process for making the carbon nanotube composite film is complex, and time consuming, which limits applications of such carbon nanotube composite film.

What is needed, therefore, is to provide a method for making carbon nanotube composite film, which can overcome the above-described shortcomings.

BRIEF DESCRIPTION OF THE DRAWINGS

Many aspects of the embodiments can be better understood with reference to the following drawings. The components in the drawings are not necessarily to scale, the emphasis instead being placed upon clearly illustrating the principles of the present disclosure. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
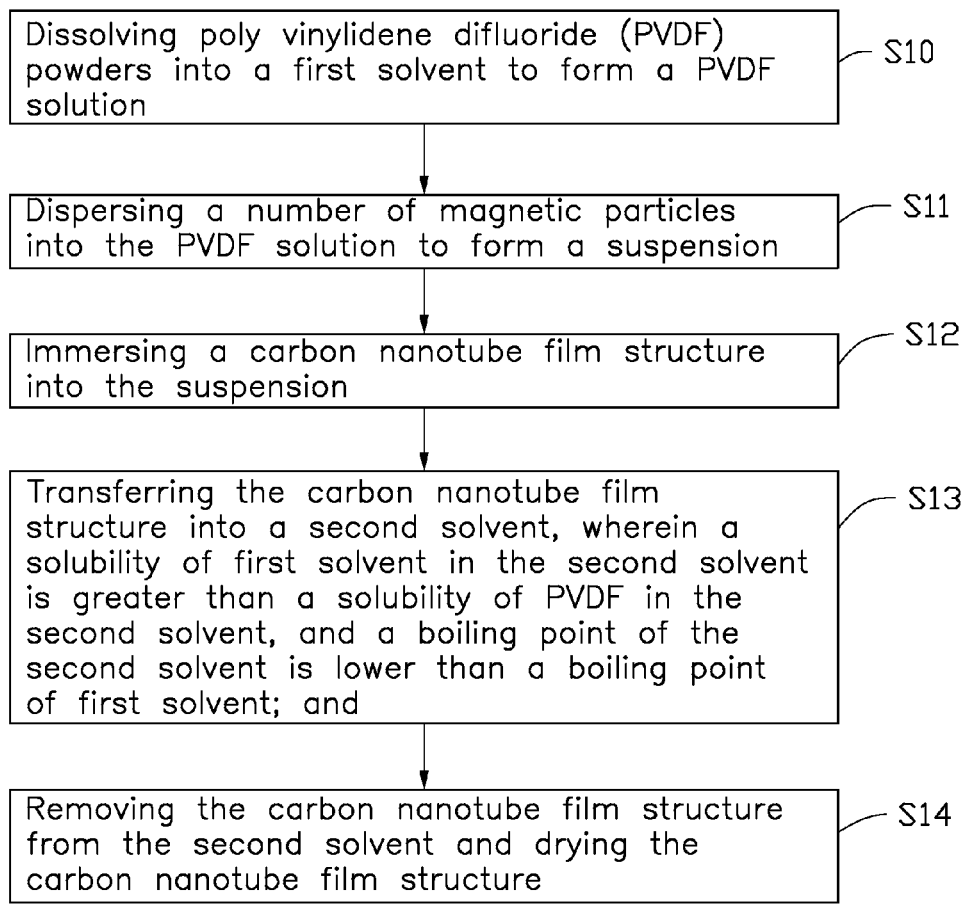
FIG. 1 shows a flowchart of one embodiment of a method of making a carbon nanotube composite film.

Referring to FIG. 1, a method for making a carbon nanotube composite film according to one embodiment can include the following steps:

(S10) dissolving poly vinylidene difluoride (PVDF) powders into a first solvent to form a PVDF solution;

(S11) dispersing a number of magnetic particles into the PVDF solution to form a suspension;

(S12) immersing a carbon nanotube film structure into the suspension;

(S13) transferring the carbon nanotube film structure into a second solvent, wherein a solubility of first solvent in the second solvent is greater than a solubility of PVDF in the second solvent, and a boiling point of the second solvent is lower than a boiling point of first solvent; and (S14) removing the carbon nanotube film structure from the second solvent and drying the carbon nanotube film structure.

In step (S10), the first solvent is not limited, as long as the PVDF can be completely dissolved in the first solvent. The first solvent can be a polar solvent, such as n-methyl pyrrolidone (NMP), dimethyl sulfoxide (DMSO), dimethylformamide (DMF), dimethyl acetamide (DMAC), or combinations thereof. In one embodiment, the first solvent is NMP. A weight percentage of the PVDF in the PVDF solution can be lower than 10 wt %. In some embodiments, the weight percentage of the PVDF in the PVDF solution ranges from about 3 wt % to about 8 wt %. In one embodiment, the weight percentage of the PVDF in PVDF solution is about 5 wt %.

In step (S11), a material of the magnetic particles can be iron, cobalt, nickel, manganese, vanadium, their alloy or their oxide. A diameter of the magnetic particles can be in a range from about 1 nanometer to about 100 microns. In some embodiments, the diameter of the magnetic particles is in a range from about 10 nanometers to about 10 microns. In one embodiment, the magnetic particles are iron oxide particles with a diameter of about 100 nanometers. After the magnetic particles are provided, the magnetic particles are dispersed in the PVDF solution by ultrasonic dispersion or mechanical agitation to form the suspension. In one embodiment, the magnetic particles are dispersed in the PVDF solution by ultrasonic dispersion for about 10 minutes. A weight percentage of the magnetic particles in the suspension is not limited.

In step (S 12), the carbon nanotube film structure is a free-standing structure, that is, the carbon nanotube film structure can support itself without a substrate. For example, if at least one point of the carbon nanotube film structure is held, the entire carbon nanotube film structure can be lifted without being damaged. A thickness of the carbon nanotube film structure can be less than 1 millimeter. The carbon nanotube film structure includes a number of carbon nanotubes. Adjacent carbon nanotubes in the carbon nanotube film structure attach to each other by the van der Waals force therebetween. Interspaces are defined in the carbon nanotube film structure and located between adjacent carbon nanotubes. The interspaces can be pores having regular or irregular shapes.

Figure 2:
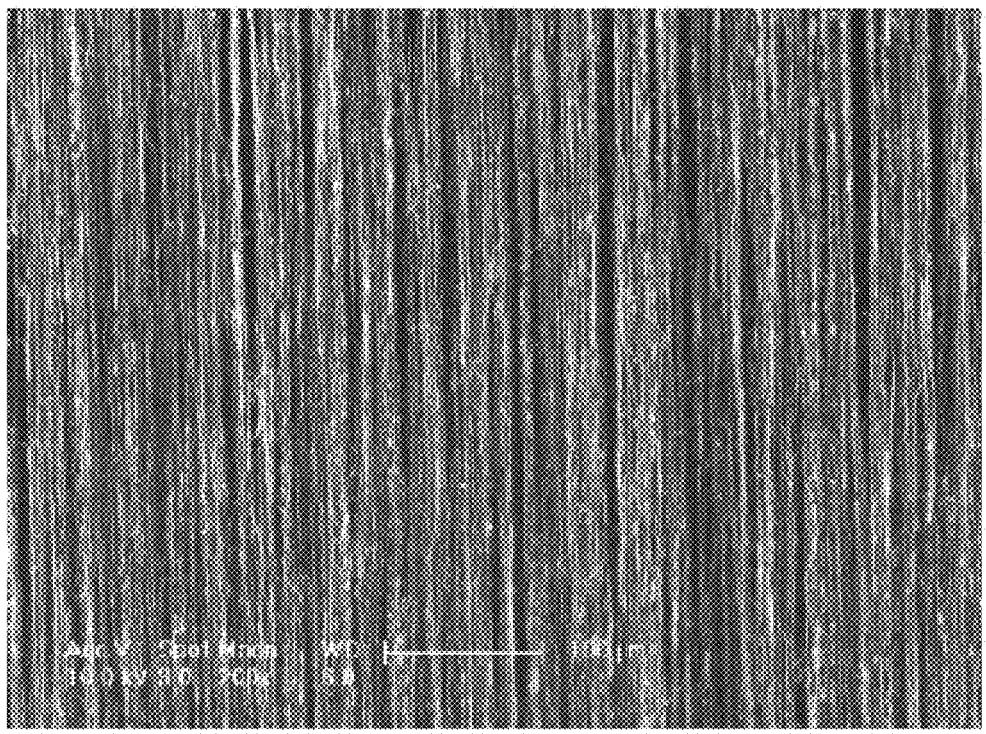
FIG. 2 is a scanning electron microscope (SEM) image of a drawn carbon nanotube film.

The carbon nanotube film structure can include at least one carbon nanotube film. Referring to FIG. 2, the carbon nanotube film can be a drawn carbon nanotube film formed by drawing a film from a carbon nanotube array. The drawn carbon nanotube film includes a number of carbon nanotubes. The carbon nanotubes in the drawn carbon nanotube film are arranged substantially parallel to a surface of the drawn carbon nanotube film. A large number of the carbon nanotubes in the drawn carbon nanotube film can be oriented along a preferred orientation, meaning that a large number of the carbon nanotubes in the drawn carbon nanotube film are arranged substantially along a same direction. Interspaces are defined in the carbon nanotube film and located between adjacent carbon nanotubes. An end of one carbon nanotube is joined to another end of an adjacent carbon nanotube arranged substantially along the same direction, by van der Waals force, to form a free-standing film. A small number of the carbon nanotubes is randomly arranged in the drawn carbon nanotube film, and have a small if not negligible effect on the larger number of the carbon nanotubes in the drawn carbon nanotube film, that are arranged substantially along the same direction. It can be appreciated that some variation can occur in the orientation of the carbon nanotubes in the drawn carbon nanotube film. Microscopically, the carbon nanotubes oriented substantially along the same direction may not be perfectly aligned in a straight line, and some curved portions may exist. It can be understood that contact between some carbon nanotubes located substantially side by side and oriented along the same direction cannot be totally excluded.

The carbon nanotube segments can vary in width, thickness, uniformity, and shape. The carbon nanotubes in the drawn carbon nanotube film are also substantially oriented along a preferred orientation. The width of the drawn carbon nanotube film relates to the carbon nanotube array from which the drawn carbon nanotube film is drawn. Furthermore, the carbon nanotube film has an extremely large specific surface area, and is very sticky.

The carbon nanotube film structure can include more than two stacked drawn carbon nanotube films. An angle can exist between the oriented directions of the carbon nanotubes in adjacent films. Adjacent drawn carbon nanotube films can be combined by the van der Waals force therebetween without the need of an adhesive. An angle between the oriented directions of the carbon nanotubes in two adjacent drawn carbon nanotube films can range from about 0 degree to about 90 degrees. The number of layers of the drawn carbon nanotube films in the carbon nanotube film structure is not limited. In some embodiments, the carbon nanotube film structure includes about 100 layers to about 1000 layers of stacked drawn carbon nanotube films. In one embodiment, the carbon nanotube film structure includes 500 layers of stacked drawn carbon nanotube films, and the carbon nanotubes in the carbon nanotube film structure are arranged substantially along the same direction.

Figure 3:
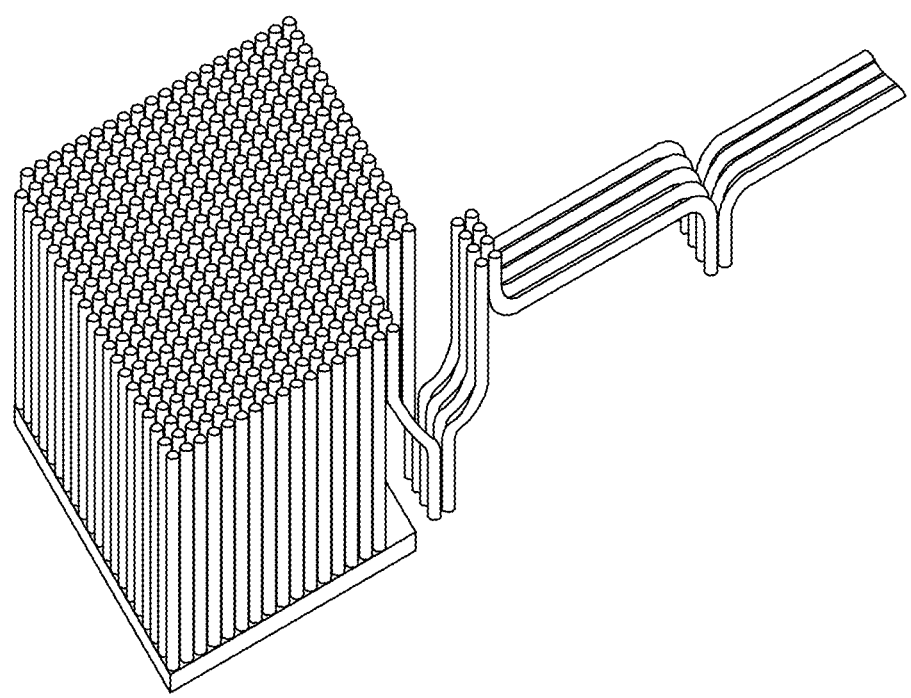
FIG. 3 shows a schematic view of drawing a drawn carbon nanotube filmfrom a carbon nanotube array.

Referring to FIG. 3, a method for making the drawn carbon nanotube film includes the sub-steps of: (S121) providing the carbon nanotube array capable of having a film drawn therefrom; and (S122) pulling/drawing out the drawn carbon nanotube film from the carbon nanotube array. The pulling/drawing can be done by using a tool (e.g., adhesive tape, pliers, tweezers, or another tool allowing multiple carbon nanotubes to be gripped and pulled simultaneously).

In step (S121), the carbon nanotube array can be formed by a chemical vapor deposition method. The carbon nanotube array includes a number of carbon nanotubes parallel to each other and approximately perpendicular to the substrate. The carbon nanotubes in the carbon nanotube array are closely packed together by van der Waals force. The carbon nanotubes in the carbon nanotube array can be single-walled carbon nanotubes, double-walled carbon nanotubes, multi-walled carbon nanotubes, or combinations thereof. The diameter of the carbon nanotubes can be in the range from about 0.5 nanometers to about 50 nanometers. The height of the carbon nanotubes can be in the range from about 50 nanometers to 5 millimeters. In one embodiment, the height of the carbon nanotubes can be in a range from about 100 microns to 900 microns.

The drawn carbon nanotube film can be pulled/drawn by the following substeps: (S122a) selecting a carbon nanotube segment having a predetermined width from the carbon nanotube array; and (S122b) pulling the carbon nanotube segment at an even/uniform speed to achieve a uniform drawn carbon nanotube film.

In step (S122a), the carbon nanotube segment having a predetermined width can be selected by using an adhesive tape such as the tool to contact the carbon nanotube array. The carbon nanotube segment includes a number of carbon nanotubes parallel to each other. In step (S122b), the pulling direction is substantially perpendicular to a growing direction of the carbon nanotube array.

Specifically, during the pulling process, as the initial carbon nanotube segment is drawn out, other carbon nanotube segments are also drawn out end-to-end due to the van der Waals force between the ends of the adjacent segments. This process of drawing ensures that a continuous, uniform carbon nanotube film having a predetermined width can be formed. The carbon nanotubes in the carbon nanotube film are parallel to the pulling/drawing direction of the drawn carbon nanotube film, and the carbon nanotube film produced in such manner can be selectively formed to have a predetermined width.

Figure 4:
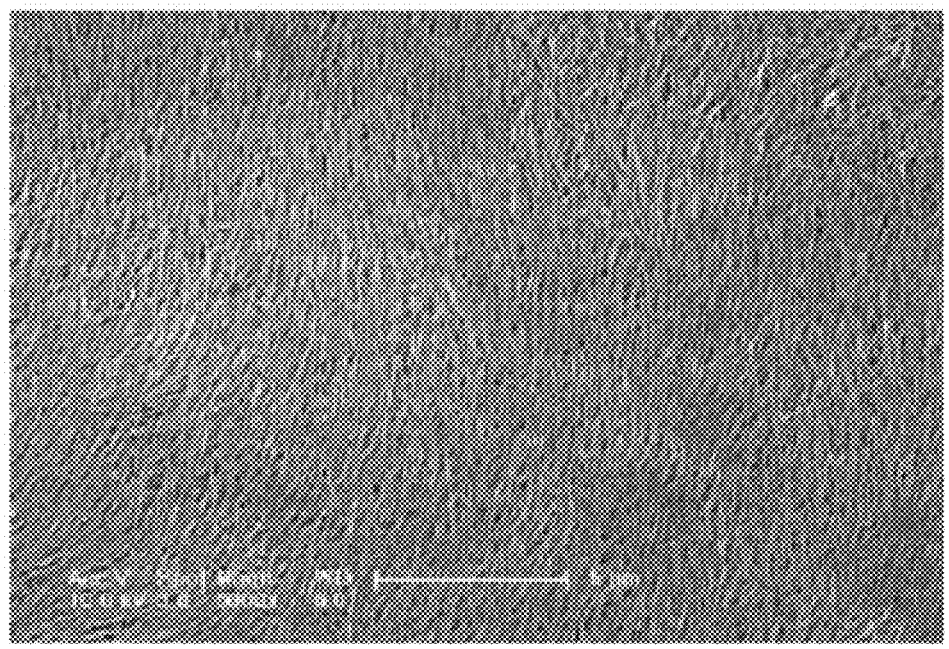
FIG. 4 is an SEM image of a pressed carbon nanotube film.

Referring to FIG. 4, the carbon nanotube film can also be a pressed carbon nanotube film formed by pressing a carbon nanotube array down on the substrate. The carbon nanotubes in the pressed carbon nanotube array can be arranged along a same direction or along different directions. The carbon nanotubes in the pressed carbon nanotube array can rest upon each other. Some of the carbon nanotubes in the pressed carbon nanotube film can protrude from a general surface/plane of the pressed carbon nanotube film. Interspaces are defined between two adjacent carbon nanotubes in the pressed carbon nanotube film. Adjacent carbon nanotubes are attracted to each other and combined by van der Waals force. An angle between a primary alignment direction of the carbon nanotubes and a surface of the pressed carbon nanotube array is about 0 degrees to approximately 15 degrees. The greater the pressure applied, the smaller the angle obtained. When the carbon nanotubes in the pressed carbon nanotube array are arranged along different directions, the carbon nanotube structure can be isotropic. The thickness of the pressed carbon nanotube array can range from about 0.5 nanometers to about 1 millimeter. The length of the carbon nanotubes can be larger than 50 micrometers. Examples of the pressed carbon nanotube film are taught by US PGPub. 20080299031 A1 to Liu et al.

Figure 5:
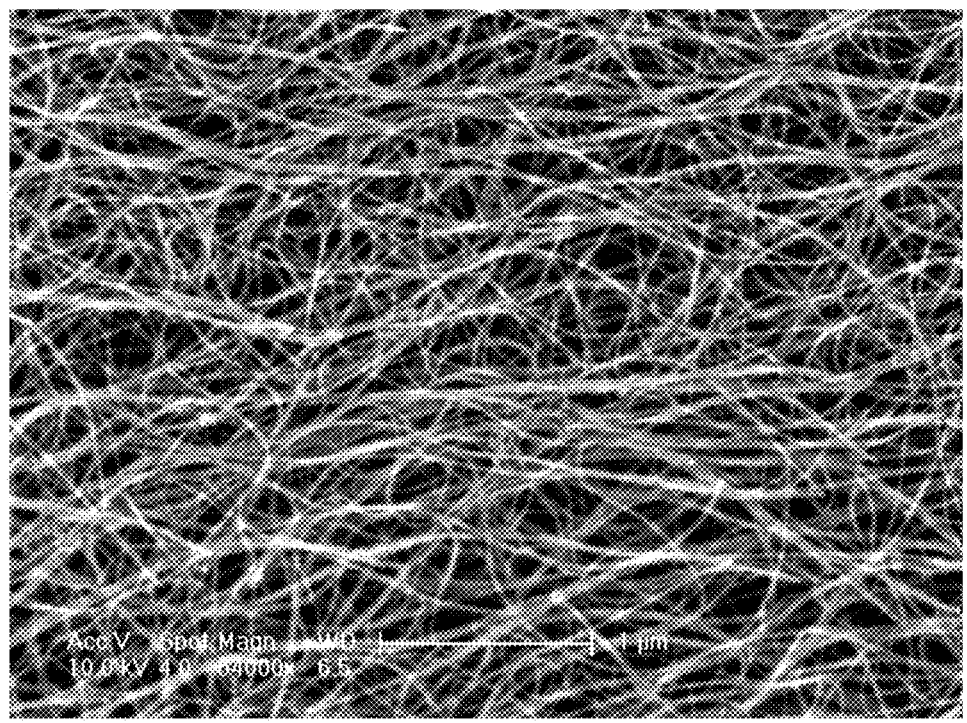
FIG. 5 is an SEM image of a flocculated carbon nanotube film.

Referring to FIG. 5, the carbon nanotube film can also be a flocculated carbon nanotube film formed by a flocculating method. The flocculated carbon nanotube film can include a number of long, curved, disordered carbon nanotubes entangled with each other. A length of the carbon nanotubes can be greater than 10 centimeters. In one embodiment, the length of the carbon nanotubes is in a range from about 200 microns to about 900 micrometers. The carbon nanotubes can be substantially uniformly distributed in the carbon nanotube film. The adjacent carbon nanotubes are acted upon by the van der Waals force therebetween. Some of the carbon nanotubes in the flocculated carbon nanotube film can protrude from a general surface/plane of flocculated carbon nanotube film. Interspaces are defined between two adjacent carbon nanotubes in the flocculated carbon nanotube film. The thickness of the flocculated carbon nanotube film can range from about 1 micrometer to about 1 millimeter.

After the carbon nanotube film structure is provided, the carbon nanotube film structure is immersed into the suspension. Thus, the interspaces of the carbon nanotube film structure can be filled with the suspension.

In step (S13), a tool (e.g., pliers or tweezers) can be used to transfer the carbon nanotube film structure from the suspension into the second solvent. In one embodiment, the carbon nanotube film structure is clamped by a tweezer and transferred from the suspension into the second solvent.

A solubility of the PVDF in the second solvent can be lower than a solubility of the first solvent in the second solvent. The solubility of first solvent in the second solvent can be at least ten times greater than the solubility of PVDF in the second solvent. The solubility of the PVDF in the second solvent can be lower than 1 gram. In some embodiments, the solubility of the PVDF in the second solvent is lower than 0.1 gram. The solubility of the first solvent in the second solvent can be higher than 10 grams. The boiling point of the second solvent can be lower than the boiling point of the first solvent. In some embodiments, the boiling point of the second solvent is lower than 100 degrees. The second solvent can be water, alcohol, acetone, chloroform or combinations thereof In one embodiment, the second solvent is water.

Because the solubility of the first solvent in the second solvent is greater than the solubility of the PVDF in the second solvent, the first solvent can be diffused in the second solvent. Thus, the PVDF can be precipitated from the suspension to fill in the interspaces of the carbon nanotube film structure and/or on surfaces of the carbon nanotube film structure. Meanwhile, the magnetic particles can also be precipitated from the suspension with the PVDF to compound in the interspaces of the carbon nanotube film structure and/or on surfaces of the carbon nanotube film structure. Specifically, the PVDF can be precipitated on surfaces of the magnetic particles to prevent the magnetic particles from aggregating together. Furthermore, the first solvent in the carbon nanotube film structure can be diffused out of the carbon nanotube film structure and dissolved into the second solvent. Thus, the amount of the first solvent in the carbon nanotube film structure can be dramatically decreased, and the interspaces of the carbon nanotube film structure can be filled with the second solvent.

The carbon nanotube film structure has a relatively thin thickness, so the first solvent can be diffused out of the carbon nanotube film structure and the second solvent can be diffused into the carbon nanotube structure completely. It should be noted that, if the thickness of the carbon nanotube structure is greater than 1 millimeter, the PVDF can be precipitated on the surfaces of the carbon nanotube film structure quickly, thus, prevent the first solvent in the center of the carbon nanotube film structure from diffusing out of the carbon nanotube film structure. Therefore, the interspaces in the center of the carbon nanotube film structure can still be filled with the first solvent.

In step (S14), the carbon nanotube film structure is removed from the second solvent and is dried. The method for drying the carbon nanotube film structure is not limited, as long as the second solvent can be evaporated from the carbon nanotube film structure. The drying can be an active or inactive process (e.g. air drying). In some embodiments, the carbon nanotube film structure is placed in an oven for a period of time at a predetermined temperature to form the carbon nanotube composite film. It should be noted that, after the carbon nanotube film structure is removed from the second solvent, the interspaces of the carbon nanotube film structure is filled with the second solvent. When drying, the PVDF can be solidified and deposited in the interspaces of the carbon nanotube film structure. Meanwhile, the second solvent can be evaporated from the carbon nanotube film structure quickly. This is because the boiling point of the second solvent is lower than the boiling point of the first solvent. In one embodiment, the carbon nanotube film structure is dried at about 100° C. for about 1 hour.

The drying process can be carried out in a vacuum condition. The boiling point of the second solvent can be lower in a vacuum condition. Thus, the second solvent can be evaporated from the carbon nanotube film structure even more quickly, and the carbon nanotube film structure can be dried at a lower temperature.

After the second solvent is evaporated from the carbon nanotube film structure to form the carbon nanotube composite film, a step of pressing the carbon nanotube composite film can be further executed. Thus, a density of the carbon nanotube composite film can be improved.

The embodiments for making a carbon nanotube composite film have at least the following advantages. First, by transferring the carbon nanotube film structure from the suspension into the second solvent, the first solvent can be diffused from the interspaces of the carbon nanotube film structure and the interspaces of the carbon nanotube film structure can be filled with second solvent. Thus, during the drying process, the second solvent can be evaporated from the interspaces of the carbon nanotube film structure quickly, and the time needed for making the carbon nanotube composite film is relatively short. Second, by precipitating the PVDF and the magnetic particles from the suspension, the PVDF and the magnetic particles can be uniformly dispersed in the interspaces of the carbon nanotube film structure. Furthermore, the method of making the carbon nanotube composite film is a simple process with a relatively low cost.

Figure 6:
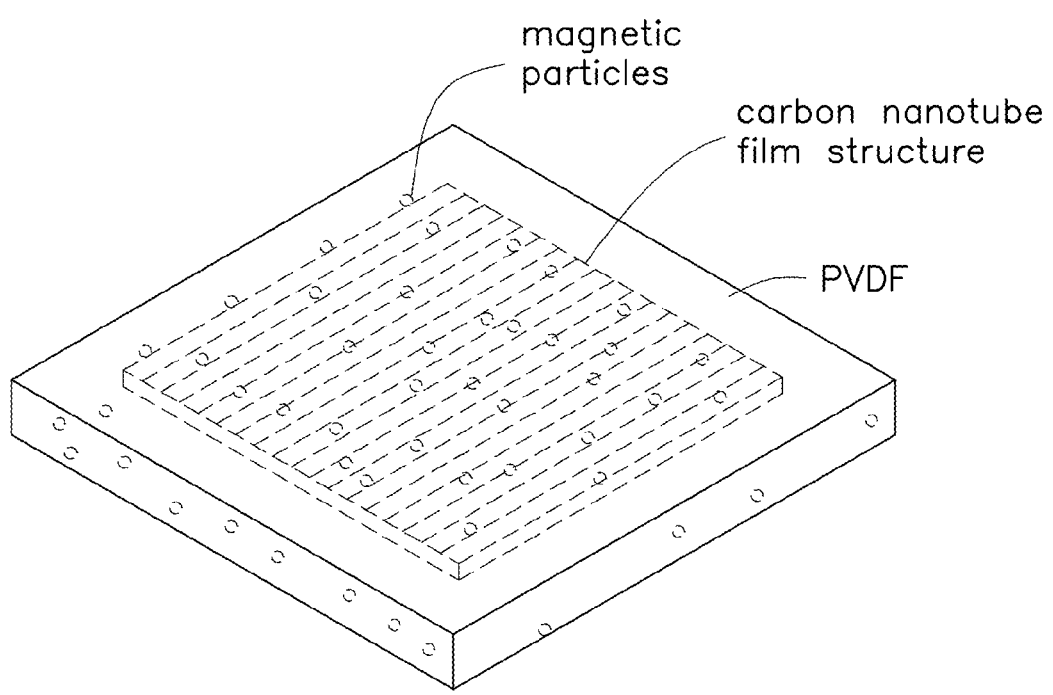
FIG. 6 shows a schematic structural view of a carbon nanotube composite film.

Referring to FIG. 6, a carbon nanotube composite film, which can be made by the above method, is a composite of a carbon nanotube film structure, a number of magnetic particles and a PVDF. A weight percentage of the carbon nanotube film structure in the carbon nanotube composite film can range from about 1% to about 30%, a weight percentage of the magnetic particles in the carbon nanotube composite film can range from about 1% to about 30%, and a weight percentage of the PVDF in the carbon nanotube composite film can range from about 40% to about 98%. In some embodiments, the weight percentage of the carbon nanotube film structure in the carbon nanotube composite film ranges from about 10% to about 30%, the weight percentage of the magnetic particles in the carbon nanotube composite film ranges from about 10% to about 30%, and the weight percentage of the PVDF in the carbon nanotube composite film ranges from about 40% to about 70%.

The carbon nanotube film structure can include a number of carbon nanotube films stacked together. In one embodiment, the carbon nanotube film structure includes 500 layers of drawn carbon nanotube films stacked together. Adjacent carbon nanotube films can be combined by the van der Waals force therebetween to form a number of interspaces. The carbon nanotube films can include a number of carbon nanotubes oriented along a preferred orientation. Adjacent carbon nanotubes in the carbon nanotube film structure can combine with each other by the van der Waals force therebetween. Interspaces can be defined in the carbon nanotube film and located between adjacent carbon nanotubes. An angle can exist between the oriented directions of the carbon nanotubes in adjacent films. The angle can be from about 0 degree to about 90 degrees. In some embodiments, the angle is about 15 degrees, 30 degrees, 40 degrees, or 85 degrees. In one embodiment, the angle is about 0 degrees.

A portion of the PVDF can be compounded in the carbon nanotube film structure. More specifically, the PVDF can be uniformly and continuously compounded in the interspaces of the carbon nanotube film structure. Other portion of the PVDF can be compounded on surfaces of the carbon nanotube film structure. More specifically, the PVDF can be uniformly and continuously compounded on surfaces of the carbon nanotube film structure to form a layer structure. A thickness of the layer structure can range from about 10 nanometers to about 100 microns. In some embodiments, the thickness of the layer structure ranges from about 10 microns to about 100 microns.

The magnetic particles can be compounded in the carbon nanotube film structure and/or on surfaces of the carbon nanotube film structure. More specifically, the magnetic particles can be compounded in the interspaces of the carbon nanotube film structure and/or on surfaces of the carbon nanotubes. The magnetic particles can be iron particle, cobalt particle, nickel particle, manganese particle, vanadium particle, or their alloy particles and oxide particles. A diameter of the magnetic particles can range from about 1 nanometer to about 100 microns. In some embodiments, the diameter of the magnetic particles ranges from about 10 nanometers to about 10 microns. In one embodiment, the magnetic particles are iron oxide particles with a diameter of about 100 nanometers.

The carbon nanotube composite film has at least the following advantages. First, the magnetic particles and the PVDF are uniformly dispersed in the carbon nanotube film structure and/or on surfaces of the carbon nanotube film structure, thus, the carbon nanotube composite film can have a relatively high magnetic permeability. Second, the carbon nanotube composite film is a macro planar structure, thus, the carbon nanotube composite film can be used in the field of transformer, chock coils, inductors or electrical filters easily.

The above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for making a carbon nanotube composite film comprising the following steps:
    (a) dissolving poly vinylidene difluoride (PVDF) powders into a first solvent to form a PVDF solution;
    (b) forming a suspension by dispersing a plurality of magnetic particles into the PVDF solution;
    (c) immersing a carbon nanotube film structure into the suspension;
    (d) transferring the carbon nanotube film structure into a second solvent; wherein a solubility of first solvent in the second solvent is greater than a solubility of PVDF in the second solvent, and a boiling point of the second solvent is lower than a boiling point of first solvent; and
    (e) removing the carbon nanotube film structure from the second solvent and drying the carbon nanotube film structure.

2. The method of claim 1, wherein the solubility of first solvent in the second solvent is at least ten times greater than the solubility of PVDF in the second solvent.

3. The method of claim 1, wherein the solubility of PVDF in the second solvent is less than 1 gram.

4. The method of claim 1, wherein the solubility of first solvent in the second solvent is greater than 10 grams.

5. The method of claim 1, wherein the first solvent is selected from the group consisting of n-methyl pyrrolidone, dimethyl sulfoxide, dimethylformamide, dimethyl acetamide, and combinations thereof.

6. The method of claim 1, wherein the boiling point of the second solvent is lower than 100 degrees.

7. The method of claim 1, wherein the second solvent is selected from the group consisting of water, alcohol, acetone, chloroform and combinations thereof.

8. The method of claim 1, wherein a weight percentage of the PVDF in the PVDF solution is lower than or equal to 10 wt %.

9. The method of claim 1, wherein a weight percentage of the PVDF in the PVDF solution is in a range from about 3 wt % to about 8 wt %.

10. The method of claim 1, wherein the step of drying the carbon nanotube film structure is carried out in a vacuum condition.

11. The method of claim 1, wherein the carbon nanotube film structure comprises at least two carbon nanotube films stacked together, and adjacent carbon nanotube films are combined by van der Waals force therebetween.

12. The method of claim 11, wherein each carbon nanotube film comprises a plurality of carbon nanotubes joined end-to-end by van der Waals force therebetween to form a free-standing structure.

13. The method of claim 12, wherein the plurality of carbon nanotubes is oriented substantially along a same direction.

14. The method of claim 1, wherein a material of the plurality of magnetic particles is selected from the group consisting of iron, cobalt, nickel, manganese, vanadium, their alloy or their oxide.

15. The method of claim 1, wherein a diameter of the plurality of magnetic particles is in a range from about 1 nanometer to about 100 microns.

16. The method of claim 1, wherein a diameter of the plurality of magnetic particles is in a range from about 10 nanometers to about 100 microns.

17. The method of claim 1, wherein a thickness of the carbon nanotube film structure is less than 1 millimeter.

* * * * *